United States Patent
Kwok et al.

(10) Patent No.: US 11,190,980 B1
(45) Date of Patent: Nov. 30, 2021

(54) TAG-BASED DATA PACKET ROUTING IN DUAL CONNECTIVITY SYSTEMS

(71) Applicant: T-Mobile USA, Inc., Bellevue, WA (US)

(72) Inventors: Ming Shan Kwok, Seattle, WA (US); Alejandro Aquirre, Sammamish, WA (US); Hsin Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/942,295

(22) Filed: Jul. 29, 2020

(51) Int. Cl.
| | |
|---|---|
| *H04W 28/08* | (2009.01) |
| *H04W 80/08* | (2009.01) |
| *H04L 12/801* | (2013.01) |
| *H04W 28/02* | (2009.01) |
| *H04W 80/02* | (2009.01) |

(52) U.S. Cl.
CPC ......... *H04W 28/0958* (2020.05); *H04L 47/14* (2013.01); *H04W 28/0231* (2013.01); *H04W 28/0819* (2020.05); *H04W 80/02* (2013.01); *H04W 80/08* (2013.01)

(58) Field of Classification Search
None
See application file for complete search history.

(56) References Cited

U.S. PATENT DOCUMENTS

| | | | | |
|---|---|---|---|---|
| 10,687,264 | B2 * | 6/2020 | Salkintzis | ............. H04W 36/22 |
| 2007/0127513 | A1 | 6/2007 | Sudini et al. | |
| 2010/0309886 | A1 * | 12/2010 | Vikberg | ............ H04W 36/0066 370/332 |
| 2015/0264706 | A1 | 9/2015 | Voigt et al. | |
| 2016/0100336 | A1 * | 4/2016 | Basavarajappa | ...... H04W 48/18 370/331 |
| 2019/0141770 | A1 * | 5/2019 | Takahashi | ............... H04W 8/24 |
| 2019/0230572 | A1 * | 7/2019 | Cheng | ................... H04W 40/12 |
| 2020/0404609 | A1 * | 12/2020 | Huang-Fu | ......... H04W 36/0011 |
| 2021/0135727 | A1 * | 5/2021 | Balasubramanian | ........................ H04B 7/0632 |

(Continued)

OTHER PUBLICATIONS

Antonioli, Roberto P., et al., "Adaptive Bearer Split Control for 5G Multi-RAT Scenarios with Dual Connectivity," Computer Networks, Jul. 2019, at https://www.researchgate.net/publication/334225045, 15 pages.

*Primary Examiner* — Eunsook Choi
(74) *Attorney, Agent, or Firm* — Lee & Hayes, P.C.

(57) ABSTRACT

A cellular system having both $4^{th}$-Generation (4G) and $5^{th}$-Generation (5G) cellular networks may be configured to use Non-Standalone (NSA) dual connectivity, in which wireless data transmissions may be made using either 4G Long-Term Evolution (LTE) or 5G New Radio (NR) radio access networks. Data packets submitted for wireless transmission are associated with one or more packet tags, such as an application identifier and a customer identifier. A radio protocol stack receives the data packets and associated packet tags and determines for each data packet, based on the associated packet tags, whether to transmit the packet using the LTE radio access network or the NR radio access network. This determination may be based in part on a routing policy that has been created and/or provided by a cellular services provider.

20 Claims, 5 Drawing Sheets

(56) References Cited

U.S. PATENT DOCUMENTS

2021/0185578 A1\* 6/2021 Zhuo ..................... H04W 36/08
2021/0185747 A1\* 6/2021 Kanamarlapudi .... H04W 36/30

\* cited by examiner

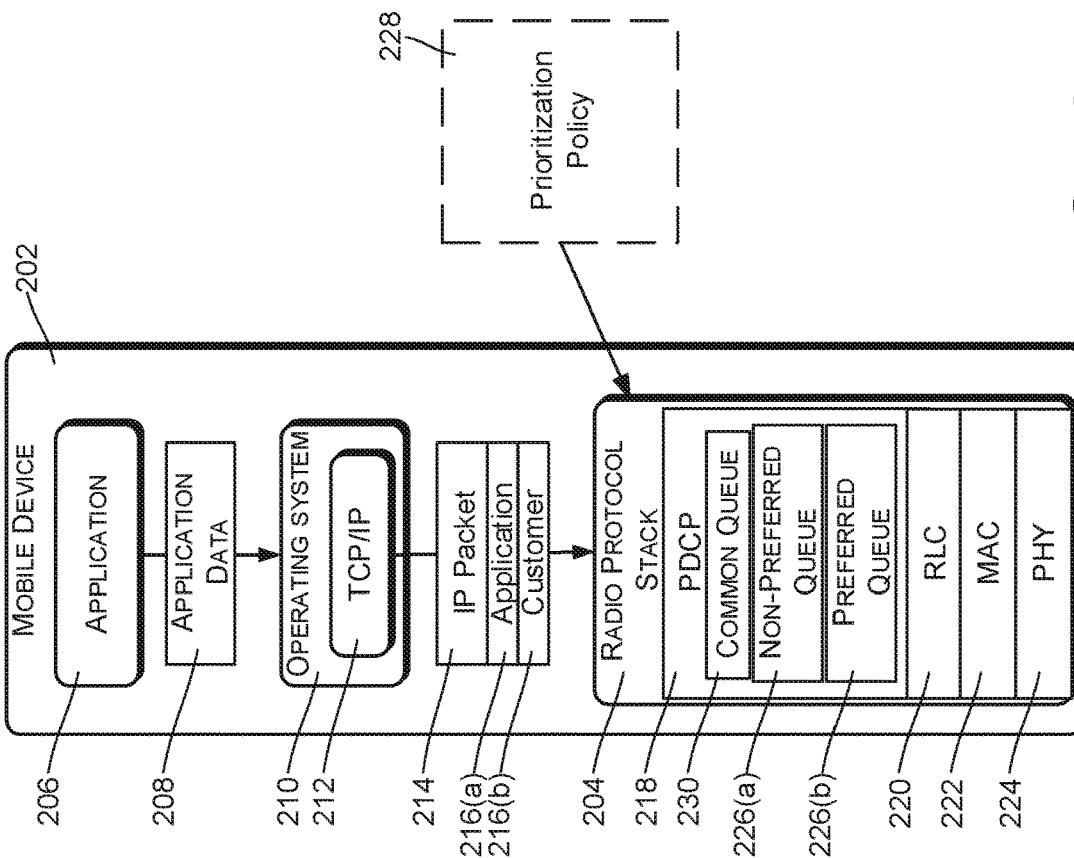
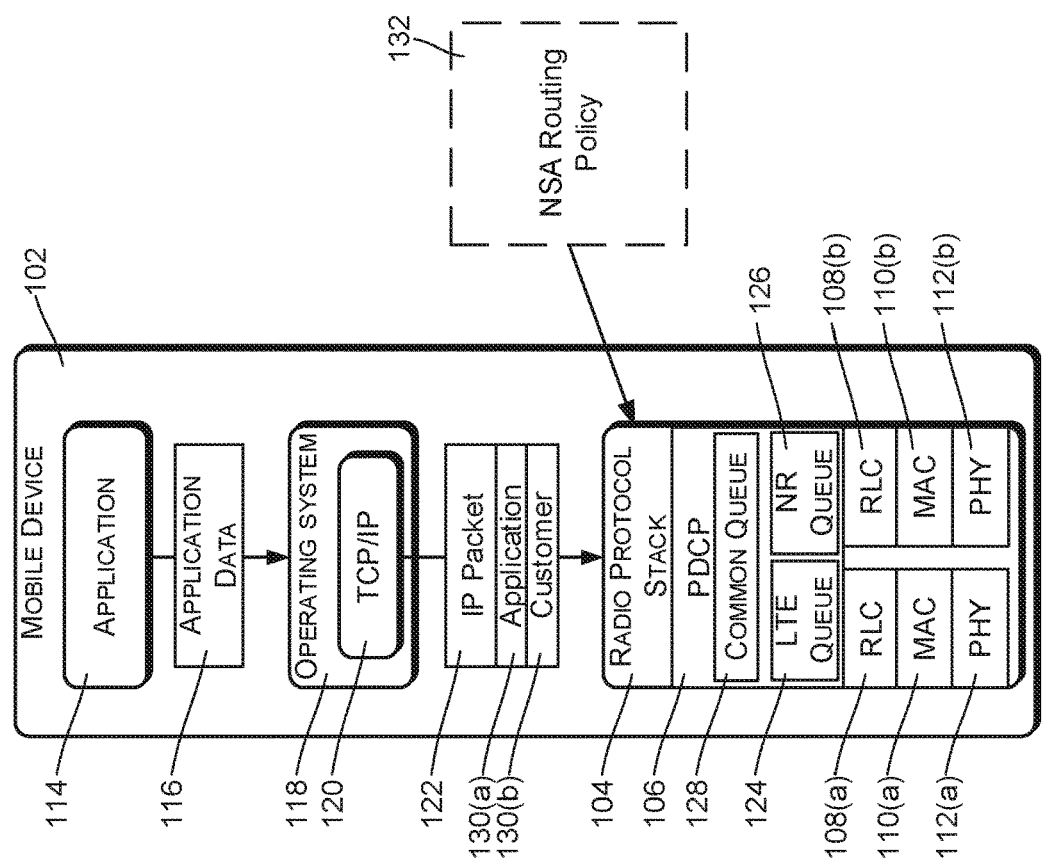

TAG-BASED DATA PACKET ROUTING IN DUAL CONNECTIVITY SYSTEMS

BACKGROUND

Cellular communication devices use network radio access technologies to communicate wirelessly with geographically distributed cellular base stations. Long-Term Evolution (LTE) is an example of a widely implemented radio access technology that is used in 4th-Generation (4G) communication systems. New Radio (NR) is a newer radio access technology that is used in 5th-Generation (5G) communication systems. Standards for LTE and NR radio access technologies have been developed by the 3rd Generation Partnership Project (3GPP) for use by wireless communication carriers.

A communication protocol defined by the 3GPP, referred to as Non-Standalone Architecture (NSA), specifies the simultaneous use of LTE and NR for communications between a mobile device and a communication network. Specifically, NSA uses dual connectivity, in which the mobile device uses both LTE and NR communication channels for transmissions to and from corresponding 4G and 5G base stations.

Mobile devices and base stations have radio protocol stacks that handle details of wireless data transmissions for standalone and dual connectivity communications. For example, data may be provided by an application, packetized to create data packets, and further processed by various layers of the radio protocol stack before being transmitted wirelessly.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a block diagram showing relevant components of a mobile communication device that uses techniques described herein to determine which of two available radio access networks should be used for transmitting an individual data packet.

FIG. 2 is a block diagram showing relevant components of a mobile communication device that uses techniques described herein to prioritize data packets that have been received for wireless transmission.

DETAILED DESCRIPTION

Figure 3:
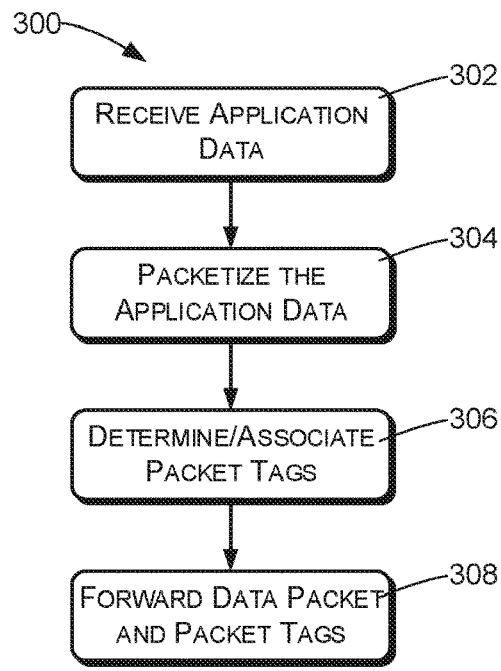
FIG. 3 is a flow diagram illustrating an example method that may be performed to associate packet tags with data packets.

Described herein are techniques for directing the transmission of Internet Protocol (IP) data packets based on information associated with the data packets. In some embodiments, the techniques utilize packet tags that are associated with individual data packets before being provided to a radio protocol stack of a mobile device or cellular base station. The packet tags may, as an example, identify the application from which the data of the data packet originated. As another example, the packet tags may identify a customer, such as a customer associated with a mobile device or that is providing services for a mobile device.

In some embodiments, the packet tags may be used for selecting between two available radio access technologies and networks when transmitting data packets. More specifically, the described techniques may be used in conjunction with $5^{th}$-Generation (5G) Non-Standalone (NSA) mode or other types of dual connectivity, in which a radio protocol stack of a network component can use either of two different radio access technologies for transmitting data packets.

In these embodiments, outgoing IP data packets are received by the Packet Data Convergence Protocol (PDCP) layer of a radio protocol stack. When using NSA, the PDCP layer may designate each data packet for either $4^{th}$-Generation Long-Term Evolution (LTE) or 5G New Radio (NR) transmission. In accordance with techniques described herein, prior to being provided to the PDCP layer the IP packets are associated with one or more packet tags, such as an application identifier and/or a customer identifier. The application identifier indicates the application responsible for the data contained in the data packet. The customer identifier indicates the entity, such as a person or organization, for which cellular services are being provided. For example, the customer identifier may correspond to the owner or user of a cellular device or to a customer account with which the device is associated. The customer identifier may alternatively correspond to and identify an entity, such as a provider of online, network-based services to which or from which the data packet is being sent.

Upon receiving a data packet, the PDCP layer uses the associated packet tags to determine whether the packet should be transmitted using the primary LTE connection or secondary NR connection of an NSA or other dual connectivity session. In some implementations, this determination may be based on a policy that has been preconfigured to specify either LTE or NR transmission for different applications and/or customers. The policy may be based on needs of different applications and the different characteristics of LTE and NR communications. In some systems, LTE may be considered to provide higher reliability than NR, as an example. Similarly, NR may be considered to provide higher bandwidth and lower latency than LTE. In some systems, data packets from applications that need high reliability, such as email applications, may be transmitted using LTE. Data packets associated with applications such as gaming applications, for example, which need low latency, may be transmitted using NR. Applications needing high throughput, such as video applications, may be also be transmitted using NR.

In some embodiments, the determination made in this manner may be treated as a preference or priority, rather than an unbreakable rule. Other factors, for example, might affect the LTE/NR routing of a data packet, such as signal availability, buffer capacity, the current performance of the two transmission technologies, and so forth.

Note that while in some embodiments a packet tag corresponds to a particular application or customer, the packet tag may in addition, or alternatively, specifically indicate a preference. For example, a packet tag may indicate a preference for reliability, throughput, or low latency. As another example, a packet tag may indicate a property associated with a customer, such as a Quality of Service (QoS) level associated with the customer, and the determination regarding whether to transmit using LTE or NR may be made in a way that supports that QoS level.

Packet tags may also, or additionally, be used for prioritizing received and buffered data packets. For example, the PDCP layer may compare the packet tags of a data packet to a preconfigured policy that specifies relative priorities for different applications and customers. Data packets from high-priority sources may then be given preference in buffer overflow conditions. Specifically, although some queued data packets may time out and be discarded to prevent buffer overflow, preferred or prioritized packets may be retained in transmission queues regardless of timeout parameters.

The described techniques enhance network functionality and user experience by customizing the transmission of data to provide the most appropriate performance characteristics for any particular application or customer.

FIG. 1 illustrates relevant components of a mobile communication device 102 that operates as a component of a cellular communication system. The mobile communication device 102 may comprise any of various types of wireless communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the wireless communication device 102 may be referred to as a User Equipment (UE) or Mobile Station (MS). As will be discussed in a later part of this description, the techniques may also be implemented by server components and network components, including by radio access network components such as $4^{th}$-Generation (4G) Long-Term Evolution (LTE) and/or $5^{th}$-Generation (5G) New Radio (NR) base stations.

The mobile communication device 102 has a radio protocol stack 104 that is typically considered part of the device's baseband or modem. In the illustrated implementation, the radio protocol stack has an upper-level Packet Data Convergence Protocol (PDCP) layer 106, one or more lower Radio Link control (RLC) layers 108, one or more yet lower Medium Access Control (MAC) layers 110, and one or more Physical (PHY) layers 112 at the lowest level.

In this example, the radio protocol stack 104 is configured to support Non-Standalone (NSA) dual connectivity, in which a communication session uses both LTE and NR technologies. The PDCP layer 106, which is common to both LTE and NR radio access technologies, receives data packets that have been provided for transmission. The PDCP layer 106 determines, in accordance with techniques described herein, whether to transmit each packet using LTE or NR radio access networks. Layers beneath the PDCP layer 106 are duplicated to support LTE and NR transmissions, respectively. In FIG. 1, the layers 108(a), 110(a), and 112(a) support LTE transmissions. The layers 108(b), 110 (b), and 112(b) support NR transmissions. For transmission, data is passed from top to bottom through the layers shown in FIG. 1.

In operation, an application 114 running on the mobile communication device 102 generates application data 116 and provides the application data 116 to a device operating system 118 for eventual wireless transmission. The application data 116 may include any types of data and network communications that are to be transmitted wirelessly.

The operating system 118 has a Transmission Control Protocol over Internet Protocol (TCP/IP) layer 120 that packetizes the application data 116 into multiple IP data packets, of which a single IP data packet 122 is shown in FIG. 1. The TCP/IP layer 120 may be considered part of an overall protocol stack that includes the layers of the radio protocol stack 104.

The data packet 122 is provided from the TCP/IP layer 120 to the PDCP layer 106 for NSA transmission using either LTE or NR radio access technologies. In certain NSA and/or other dual connectivity implementations, LTE radio access technology is used for a primary channel and NR radio access technology is used, when available, for a secondary channel.

The PDCP layer 106 may maintain multiple transmission queues corresponding respectively to different data bearers, which may in turn be used by different services. Application data, including data from multiple applications executing on the device 102, is typically transmitted over a single bearer, using a single first-in first-out transmission queue. This data is sometimes referred to as Internet data. Note that the terms "queue" and "buffer" are used interchangeably herein.

In embodiments described herein, packets received by the PDCP layer 106, which would otherwise be queued in a single transmission queue corresponding to Internet data, are instead routed by the PDCP layer 106 into one of two queues: an LTE transmission queue 124 for data packets to be transmitted using LTE and an NR transmission queue 126 for data packets to be transmitted using NR.

In some cases, these data packets may be initially stored in a common packet queue 128 before being moved to one of the LTE and NR queues 124 and 126.

Data packets from the LTE transmission queue 124 are routed to the LTE RLC layer 108(a) on a first-in, first-out basis, for transmission using LTE components of the device 102. Data packets from the NR queue 126 are routed to the NR RLC layer 108(b) on a first-in first out basis, for transmission using NR components of the device 102.

In this example, the PDCP layer 106 makes the decision regarding whether the data packet 122 will be transmitted using LTE or NR based on one or more packet tags 130 that have previously (i.e., before being received by the PDCP layer 106) been associated with the data packet 122. As examples, the packet tags may comprise at least one of an application identifier 130(a) and a customer identifier 130 (b).

The application identifier 130(a) may in some cases indicate the particular application that generated the data of the data packet. As examples, different application identifiers may correspond respectively to specific applications such as Facebook®, Photoshop®, Zoom®, etc. Alternatively, application identifiers may correspond to application types, such as video, audio, email, chat, industrial control, etc. An application identifier may also correspond to a server application to which the data packet is destined.

The customer identifier 130(b) may indicate or correspond to a customer, such as an individual or organization using the device 102 or to whom the device 102 belongs. As another example, the customer identifier 130(b) may indicate or correspond to a particular customer account with which the device 102 is associated. As yet another example, the customer identifier 130(b) may indicate or correspond to a provider of services with which the data packet 122 is associated.

In some cases, the TCP/IP layer 120 may embed the packet tags 130 in the data packet 122. In other cases, the TCP/IP layer 120 may communicate the packet tags 130 to the PDCP layer 106 separately from the data packet but designate the packet tags 130 in a way that associates them with the data packet 122.

The PDCP layer 106 may use an NSA routing policy 132 to determine the appropriate routing for packets associated with different packet tags 130 or combinations of packet tags. For example, the routing policy 132 may specify that data packets associated with a particular packet tag 130 or combination of packet tags 130 are to be transmitted using NR, while others are to be transmitted using LTE. Note that in some cases, the PDCP layer 106 may be configured to use best efforts to comply with the routing policy 132, but may violate the policy as necessary in light of available resources.

In some cases, the NSA routing policy 132 may be preconfigured and stored on the device 102. In some cases, the routing policy 132 may be configurable and/or may be changed by downloading a new routing policy from a cellular service provider. For example, a cellular service provider might initially configure the device 102 with the routing policy 132 and provide updated policies from time to time.

FIG. 2 illustrates an example of an alternative technique for utilizing packet tags such as this. FIG. 2 shows a mobile communication device 202 having generally the same components as the device shown in FIG. 1, including a radio protocol stack 204, an application 206 that produces and provides application data 208, an operating system 210, and a TCP/IP layer 212 that packetizes the application data 208 to produce IP packets 214. The IP packets 214 may include packet tags 216 as described above, including an application identifier 216(a) and a customer identifier 216(b).

The radio protocol stack 204 is configured to use the packet tags 216 to prioritize data packets when encountering queue size limitations. More specifically, the protocol stack 204 has a PDCP layer 218 configured to manage queue overflow by discarding certain queued IP packets. In accordance with techniques described herein, the PDCP layer 218 designates an IP packet 214 as being either preferred or non-preferred. To managing queue overflows, the PDCP layer 218 is configured to discard older non-preferred IP packets but to retain preferred IP packets.

In this example, the radio protocol stack 204 is configured to support a standalone mode, such as an LTE standalone connection or an NR standalone connection. Accordingly, the radio protocol stack 204 includes a single RLC layer 220, a single MAC layer 222, and a single PHY layer 224, all of which may support a single radio access technology such as NR or LTE.

The PDCP layer 218 in this example has transmission queues 226 corresponding to data packets having different priorities. In FIG. 1, the transmission queues 226 include a non-preferred transmission queue 226(a) and a preferred transmission queue 226(b), to be used for non-preferred and preferred IP packets, respectively. The PDCP layer 218 in this example applies a timeout mechanism to the data packets of the non-preferred queue 226(a) so that data packets that have been the non-preferred queue for a predetermined amount of time without being transmitted are discarded. The PDCP layer 218 does not apply the timeout mechanism to the data packets of the preferred queue 226(b). Accordingly, data packets of the non-preferred queue 226(a) are discarded as appropriate to manage queue overflow, while the data packets of the preferred queue 226(b) are retained, regardless of how long they have been queued.

The PDCP layer 218 selects one of the non-preferred queue 226(a) and the preferred queue 226(b) for an individual IP packet based upon the packet tags 216 associated with the data packet and further upon a prioritization policy 228 that is similar to the NSA routing policy 132 except that the policies of the prioritization policy 228 are for determining whether or not any given packet will be considered preferred or non-preferred. The prioritization policy 228 may indicate, for example, that packets of a particular application, customer, or combination of application and customer are to be placed into the non-preferred queue 226(a), while other data packets of a different application, customer, or combination of application and customer are to be placed in the preferred queue 226(b).

The implementation of FIG. 2 may also include a common queue 230. Received packets may be initially stored by the PCDP layer 218 in the common queue 230 and then moved into the non-preferred queue 226(a) or the preferred queue 226(b) as appropriate in light of the packet tags 216 and the prioritization policy 228.

The respective techniques illustrated with reference to FIGS. 1 and 2 may be used in conjunction with each other. For example, a non-preferred queue and a preferred queue may be configured as sub-queues within each of the LTE transmission queue 124 and the NR transmission queue 126, so that the packets of each of these queues may be prioritized in accordance with the prioritization policy 228. Furthermore, different implementations may have additional PDCP transmission queues that are used for application data. In the context of FIG. 1, for example, a dedicated queue might be provided for each application, and the data packets from that queue transmitted using either LTE or NR in accordance with the NSA routing policy 132 and prioritized in accordance with the prioritization policy 228. As another example, some implementations may include queues and prioritization policies for more than two levels of prioritization, and different queue timeout values might be used for each of these queues. Note also that the techniques described with reference to FIG. 1 may be applied to any dual connectivity configuration, not limited to NSA, LTE, or NR.

FIG. 3 illustrates an example method 300 that may be performed by the operating system 118 of FIG. 1, and particularly by the TCP/IP layer 120 of the operating system 118, when packetizing data for eventual wireless transmission using a radio access technology or a combination of radio access technologies. The method 300 may also be performed by the operating system 210 of FIG. 2, and particularly by the TCP/IP layer 212 of the operating system 210 when packetizing data for eventual wireless transmission using a radio access technology or a combination of radio access technologies.

An action 302 comprises receiving application data from one or more applications. This data may be part of typical communications and data transfers that take place during operation of an application, such as one of the applications 114 and 206, that is communicating wirelessly with a remote entity such as a network-based service or application.

An action 304 comprises packetizing the application data to create data packets, in accordance with TCP/IP protocols.

An action 306 comprises determining one or more packet tags to be associated with an individual data packet. Packet tags may include one or more of an application identifier, a customer identifier, or other type of identifier. An application identifier identifies or corresponds to an application, an instance of which has provided and/or is associated with the application data that has been packetized. An application identifier may also, or alternatively, correspond to a network-based application or service to which the data packet is being sent. A customer identifier identifies or corresponds to a user, owner, or account, for example, that is associated with the device 102. The customer identifier may also, or alternatively, identify or correspond to a user, owner, account holder, or other entity that is using the application 114 or that is receiving services provided by the application 114. The customer identifier may also, or alternatively, identify or correspond to a provider of online, network-based services with which the data packet is associated.

In some cases, the action 306 may be performed using packet inspection, including IP address analysis and/or deep packet inspection, as will be described in more detail below with reference to FIGS. 7 and 8.

The action 306 includes associating the one or more packet tags with the data packet. In some implementations, a packet tag may be embedded in a payload of the data packet or in another field of the data packet. In other embodiments, such a packet tag may be associated with the data packet in some other way, such as by routing the packet tag along with the data packet.

An action 308 comprises forwarding the data packet and associated packet tag(s) to the PDCP layer of a radio protocol stack. As mentioned, one or more packet tags may be embedded within some portion of the data packet. Alternatively, such packet tags may be provided as additional data along with the data packet.

Figure 4:
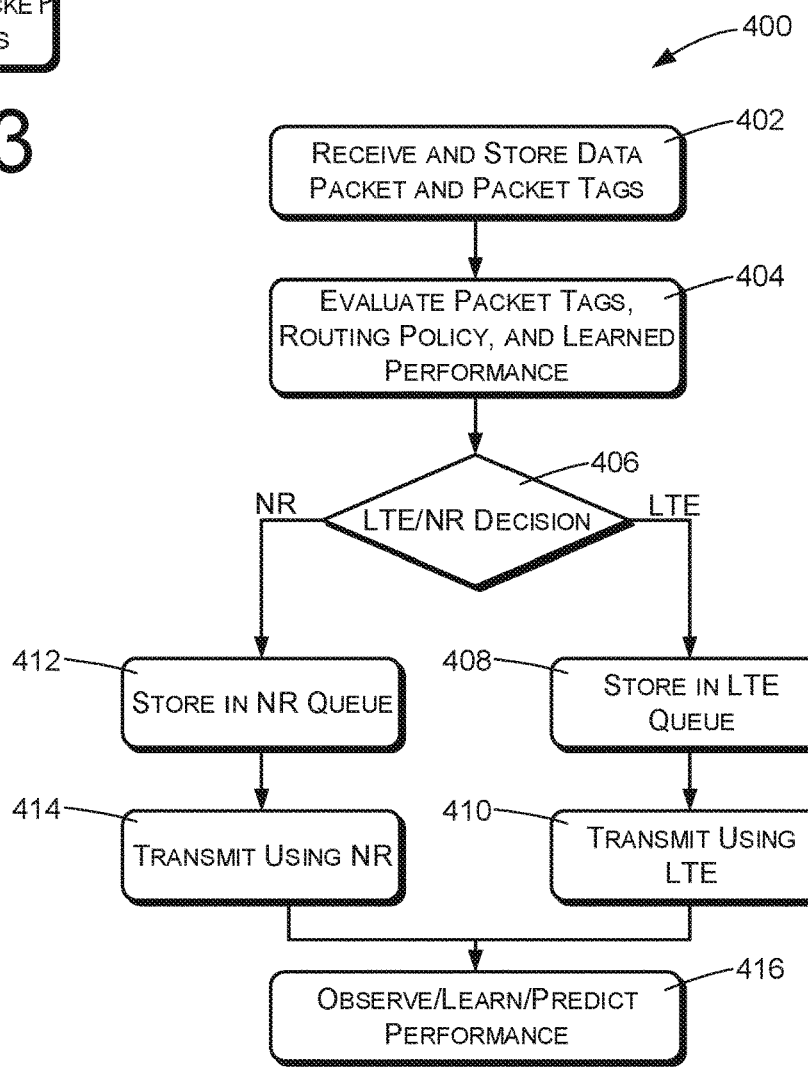
FIG. 4 is a flow diagram illustrating an example method that may be performed to determine which of two available radio access networks should be used for transmitting an individual data packet.

FIG. 4 illustrates another example method 400, which may be performed by a one or more components of a cellular communication system. For example, the method 400 may be performed by the radio protocol stack 104 of the device 102 shown in FIG. 1.

An action 402, which in the described embodiment is performed by the PDCP layer 106 of the radio protocol stack 104, comprises receiving a data packet and associated packet tags, such as a packet and packet tags forwarded in accordance with the method 300 of FIG. 3. In the embodiment of FIG. 1, the data packet and packet tags are received from the TCP/IP layer 120.

The action 402 may in some cases comprise storing the data packet and associated packet tags in a common queue, such as the common packet queue 128.

An action 404, again performed by the PDCP layer 106 in this embodiment, comprises determining whether the data packet is associated with a particular application and/or customer. In the described embodiment, the action 404 is based at least in part on the packet tags associated with the data packet. More specifically, the action 404 comprises evaluating any packet tags associated with the data packet to determine whether to add the data packet to the LTE transmission queue 124 or to the NR transmission queue 126. The evaluation may be based on a routing policy, such as the NSA routing policy 132, which has been preconfigured to implement policies of a cellular service provider. The routing policy in some cases may be received and/or updated periodically from the provider network.

In some cases, the determination of whether to use LTE or NR for transmission of a particular data packet may be based at least in part on a prioritization of radio access network performance characteristics that have been associated by the routing policy 132 with an application identifier, a customer identifier, and/or a combination of an application identifier and a customer identifier. Performance characteristics may include latency, reliability, and/or throughput, for example. The prioritization policy 228 may indicate which of these characteristics are to be prioritized or emphasized for a particular application identifier, customer identifier, and/or combination thereof, and the action 404 may be based at least in part on these prioritizations.

An action 406 represents routing the data packet for either LTE or NR transmission. If the PDCP layer 106 determines to transmit the data packet using LTE radio access technology, an action 408 is performed by the PDCP layer 106 of storing the data packet in the LTE transmission queue 124. Lower LTE layers of the protocol stack 104, such as the RLC layer 108(a) and the MAC layer 110(a), cooperate to then perform an action 410 of obtaining the data packet form the LTE transmission queue 124 and transmitting it wirelessly using the LTE radio access network of a cellular service provider.

If the PDCP layer 106 determines to transmit the data packet using NR radio access technology, an action 412 is performed by the PDCP layer 106 of storing the data packet in the NR transmission queue 126. Lower NR layers of the protocol stack 104, such as the RLC layer 108(b) and the MAC layer 110(b), eventually perform an action 414 of obtaining the data packet from the NR transmission queue 126 and transmitting it wirelessly using the NR radio access network of the cellular service provider.

An action 416 may performed in some embodiments. The action 416, which may be performed by the PDCP layer 106 or by some other component, comprises observing performance characteristics of the LTE and NR radio access networks at multiple times and/or locations. The action 416 may further include, based on the performance observations, predicting the performance characteristics of the LTE and NR radio access networks at a given time and/or location. This information may be used in the action 404 to further inform the decision regarding whether to use LTE or NR for any given data packet at the current time, when the device 102 is at a given current location or position. That is, determining whether to transmit the data packet using the LTE radio access network or the NR radio access network may be based at least in part on the predicted performance characteristics radio access networks at the current time and at the current location of the device 102.

Figure 5:
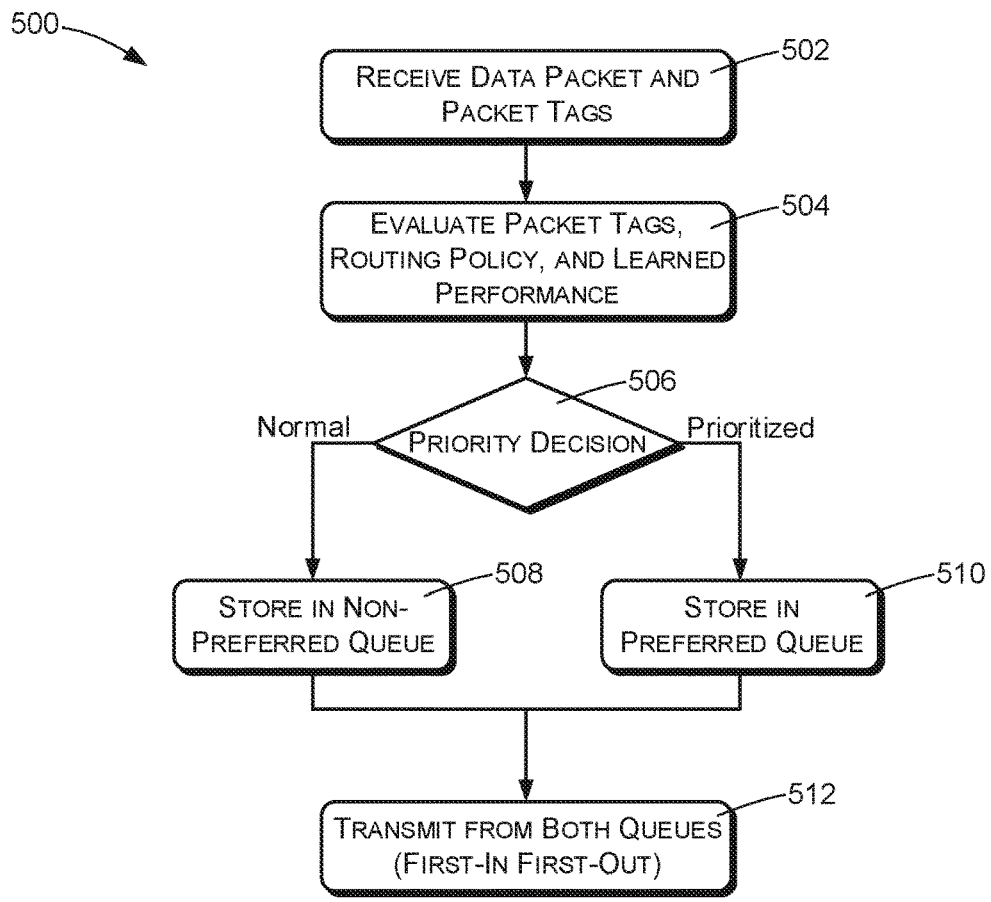
FIG. 5 is a flow diagram illustrating an example method that may be performed to prioritize data packets that have been received for wireless transmission.

FIG. 5 illustrates another example method 500 that may be performed by a component of a cellular communication system. The method 500 may be used in the embodiment of FIG. 2, for example. More specifically, the example method 500 may be performed by the radio protocol stack 204 of the mobile communication device 202.

An action 502, which in the described embodiment is performed by the PDCP layer 218 of the radio protocol stack 204, comprises receiving a data packet and associated packet tags, such as a packet and packet tag provided in accordance with the method 300 of FIG. 3. In the embodiment of FIG. 2, the data packet and packet tags are received from the TCP/IP layer 212. The packet tags may in some cases be embedded in the data packet. In other cases, the packet tags may be associated with the data packet by another associating mechanism and/or by other communications.

The action 502 may in some cases may comprise storing the data packet and associated packet tags in a common buffer, such as the common queue 230.

An action 504, again performed by the PDCP layer 218 in this embodiment, comprises evaluating any packet tags associated with the data packet to determine the transmission priority of the data packet, relative to other data packets. In the described embodiment, the action 504 may comprise designating each data packet as preferred or non-preferred, based on relative transmission priorities of the data packets in light of the prioritization policy 228. For example, the prioritization policy 228 may indicate that a data packet associated with a particular application and/or a particular customer is preferred, while another data packet, associated with another application and/or another customer, is non-preferred. The prioritization policy 228 in some cases may be received and/or updated periodically from a cellular services provider network.

An action 506 represents a decision regarding whether to designate the data packet as preferred or non-preferred, and to store the data packet in the corresponding non-preferred queue 226(a) or preferred queue 226(b). If the PDCP layer 218 designates the data packet as non-preferred, an action 508 is performed by the PDCP layer 218 of storing the data packet in the non-preferred queue 226(a). This might be the case, for example, if the data packet is associated with a particular customer, application, and/or combination of customer and application.

If the PDCP layer 218 designates the data packet as preferred, an action 510 is performed of storing the data packet in the preferred queue 226(b). This might be the case, for example, if the data packet is not associated with the particular customer, application, and/or combination of customer and application, or is associated with a different customer, application, and/or combination of customer and application.

An action 512 is performed on an ongoing basis. The action 512 comprises transmitting data packets from both the non-preferred queue 226(a) and the preferred queue 226(b), on a first-in, first-out basis. In some embodiments, the action 512 may comprise determining which of the queued data packets has the earliest timestamp and transmitting that data packet. Lower layers of the protocol stack 204, such as the RLC layer 220 and the MAC layer 222, cooperate to perform the action 512 and to transmit the data packet wirelessly to the radio access network using the PHY layer 224.

Figure 6:
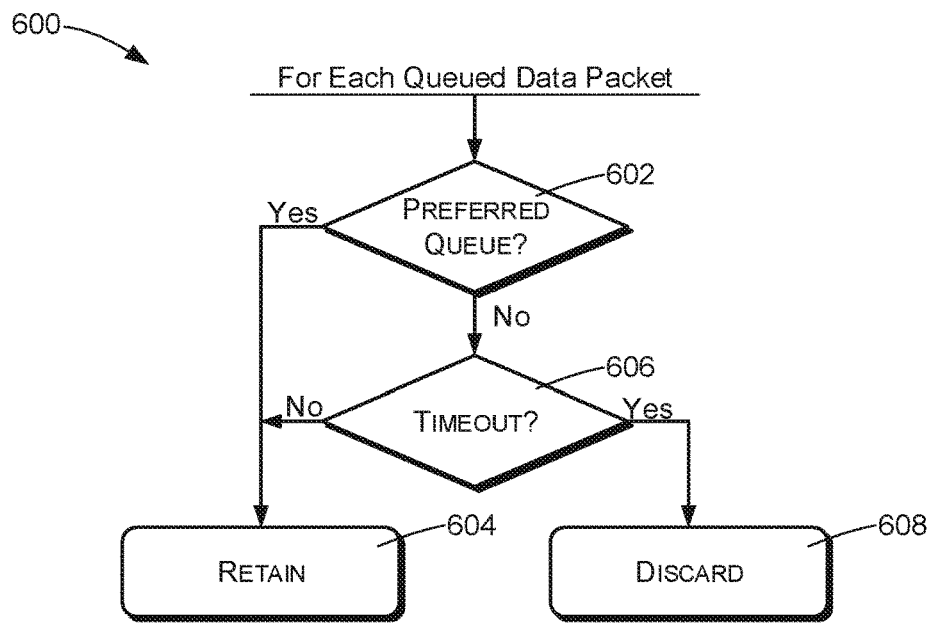
FIG. 6 is a flow diagram illustrating an example method that may be used to prioritize designated packets to manage queue overflows.

FIG. 6 illustrates an example method 600 that may be performed by the PDCP layer 218 of to manage queues in response to queue size limitations. The method 600 is performed repetitively for each data packet of the non-preferred queue 226(a) and the preferred queue 226(b).

Each data packet has or is associated with a timestamp corresponding to the time that it was queued by the PDCP layer 218 for transmission. A packet is said to have timed out if the elapsed time, subsequent to the time indicated by the timestamp, exceeds a predetermined value. The method 600 is used to manage queue overflows by discarding packets of the non-preferred queue 226(a) in as needed, while retaining the packets of the preferred queue 226(b).

An action 602 comprises determining whether the data packet is in the preferred queue 226(a). If the packet is in the preferred queue 226(a), the data packet is retained in an action 604 despite its timestamp and despite being in the preferred queue 228(a) for longer than the preconfigured timeout period.

If the packet is in the non-preferred queue 226(b), an action 606 is performed. The action 606 comprises determining whether the data packet has timed out by being in the non-preferred queue 226(b) for more than the preconfigured timeout period, based on its timestamp. If the data packet has not timed out, the action 604 is performed of retaining the data packet in the non-preferred queue 226(a). If the data packet has timed out, the data packet is discarded in an action 608, and will not be transmitted or passed on to lower levels of the protocol stack 204.

Figure 7:
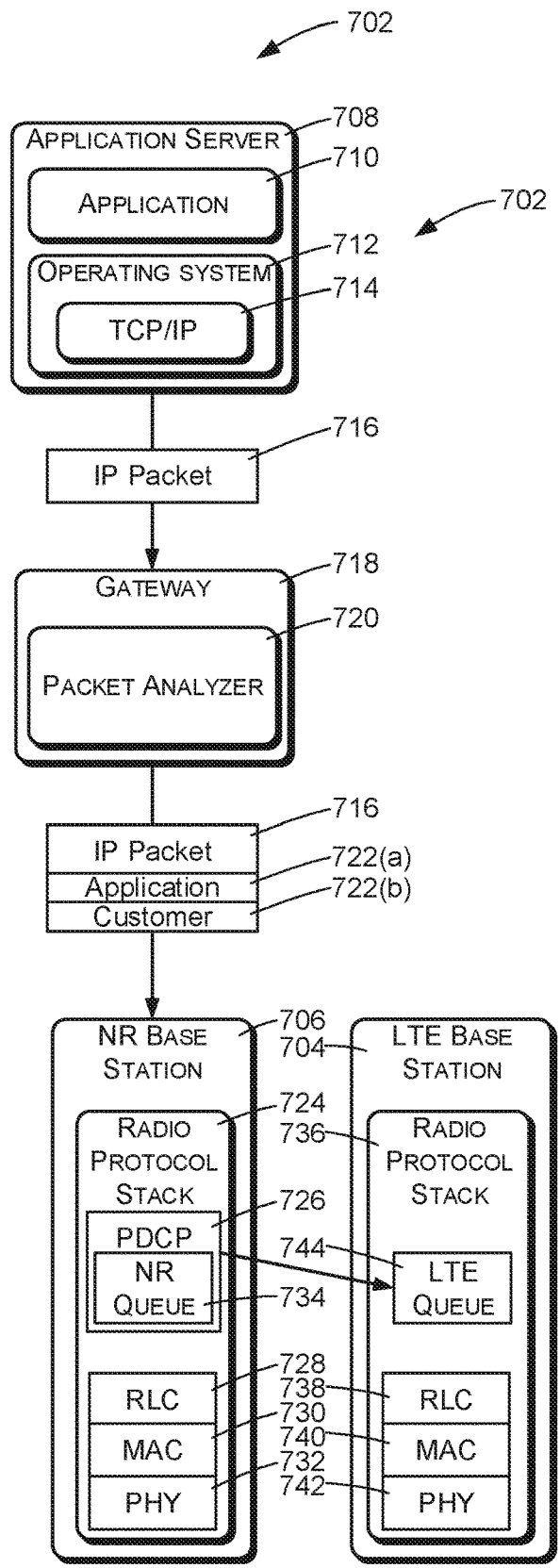
FIG. 7 is a block diagram showing relevant components of a cellular communication system that uses techniques described herein to determine which of two available radio access networks should be used for transmitting an individual data packet.

FIG. 7 illustrates relevant components of a cellular communication system 702 that can be configured to implement the techniques described herein. In this embodiment, the system 702 is configured to support NSA dual connectivity using an LTE radio access network and an NR radio access network. More specifically, the system 702 utilizes an LTE base station 704 and an NR base station 706. The LTE and NR base stations 704 and 706 are illustrated in a configuration that supports NSA dual connectivity.

In the illustrated embodiment, a network-based application server 708 is configured to provide services to mobile devices. The application server 708 runs an application 710 to provide the services. The application server 708 also has an operating system 712. The operating system 712 includes a TCP/IP protocol layer 714 that receives data from the application 710 and that packetizes the data to create IP data packets 716, only one of which is shown in FIG. 7.

The data packet 716 is sent through various system network components until is received by a gateway 718 of the system 702. As an example, the gateway 718 may comprise a serving gateway or a proxy gateway.

The gateway 718 in this embodiment may include a packet analyzer 720 configured to assign packet tags 722 to each data packet 716 based on packet inspection. A packet tag may comprise an application identifier 722(a), a customer identifier 722(b), or other type of identifier as already described above. In some embodiments, the packet analyzer 720 may assign the packet tags 722 based on source and/or destination IP addresses associated with each data packet. As another example, the packet analyzer 720 may perform deep packet analysis or other types of packet analyses to determine and assign the packet tags 722.

The NR base station 706 has an NR radio protocol stack 724 that includes a PDCP layer 726, an RLC layer 728, a MAC layer 730, and a PHY layer 732. The PDCP layer 726 has a transmission queue 734, referred to herein as an NR transmission queue 734. Packets in the NR transmission queue 734 are passed through successively lower layers of the NR protocol stack 724 for wireless transmission using NR radio access technology.

The LTE base station 704 has an LTE radio protocol stack 736 that includes an RLC layer 738, a MAC layer 740, and a PHY layer 742. The radio protocol stack 736 has a transmission queue 744, referred to herein as an LTE transmission queue 744. Packets in the LTE transmission queue 744 are passed through successively lower layers of the LTE protocol stack 736 for wireless transmission using LTE radio access technology.

In the configuration of FIG. 7, IP packets are passed through various system network components from the gateway 718 to the NR base station 706, and to the PDCP layer 726 of the NR base station 706. For each received data packet 716, the PDCP layer 726 of the NR base station 706 analyzes the associated packet tags 722 to determine which of the NR and LTE radio access technologies to use for transmitting the data packet 716. If the PDCP layer 726 determines to transmit the data packet 716 using the NR radio access technology, the data packet is put into the NR queue 734 for subsequent wireless transmission using an NR radio access network. If the PDCP layer 726 determines to transmit the data packet 716 using the LTE radio access technology, the data packet 716 is forwarded from the NR base station 706 to the LTE base station 704, where it is stored in the LTE transmission queue 744 for subsequent wireless transmission using an LTE radio access network.

The system 702 may be configured to perform the method 300 of FIG. 3. More specifically, the TCP/IP layer 714 of the application server 708 may perform the FIG. 3 actions of receiving and packetizing application data. The gateway 718 may perform the subsequent actions of determining packet tags and of forwarding the packets and tags, in this case to the NR base station 706. In some cases, the action 306 of determining the packet tags may be performed by the packet analyzer 720, using IP address analysis and/or various other forms of packet inspection, including deep packet inspection.

The system 702 may also be configured to perform the method 400 of FIG. 4. Specifically, the actions of FIG. 4 may be performed by one or more of the LTE base station 704 and the NR base station 706, and by one or more of the radio protocol stacks 724 and 736 of the base stations 704 and 706.

Figure 8:
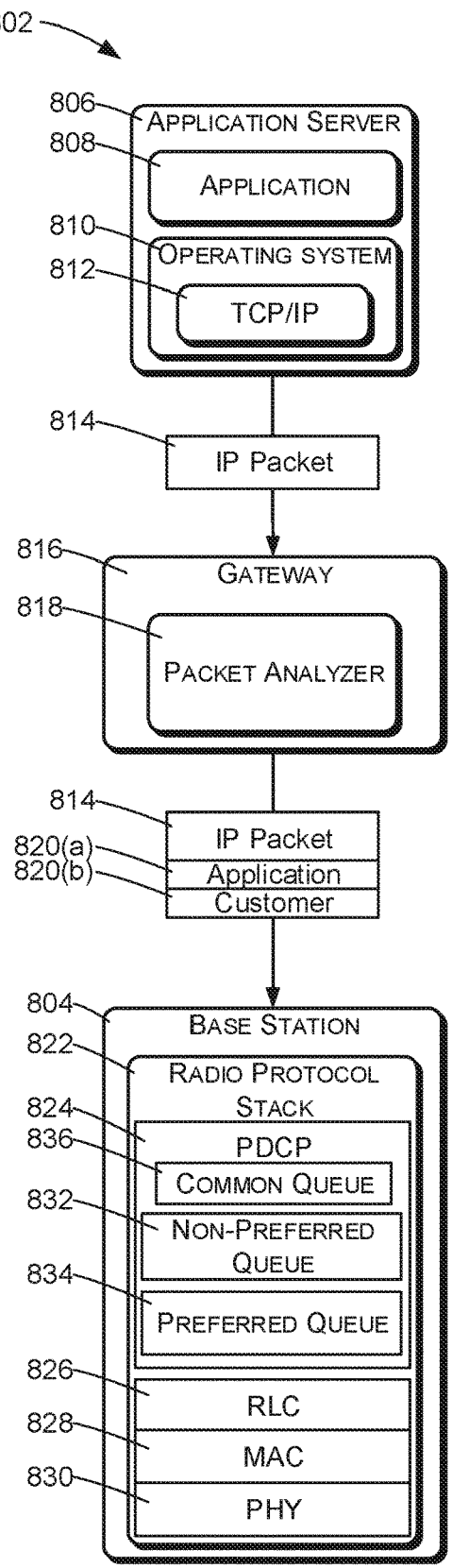
FIG. 8 is a block diagram showing relevant components of a cellular communication system that uses techniques described herein to prioritize data packets that have been received for wireless transmission.

FIG. 8 illustrates relevant components of a cellular communication system 802 that can be configured to implement certain of the techniques described herein. In this embodiment, the system 802 is configured to support a single radio access technology, such as LTE or NR. More specifically, the system 802 utilizes a base station 804, which may comprise an LTE base station or an NR base station.

In the illustrated embodiment, a network-based application server 806 is configured to provide services to mobile devices. The application server 806 runs an application 808 to provide the services. The application server 806 also has an operating system 810. The operating system 810 includes a TCP/IP protocol layer 812 that receives data from the application 808 and that packetizes the data to create data packets 814, only one of which is shown in FIG. 8.

The IP packet 814 is sent through various system network components until is received by a gateway 816 of the system 802. As an example, the gateway 816 may comprise a serving gateway or a proxy gateway.

The gateway 816 in this embodiment may include a packet analyzer 818 configured to assign packet tags 820 to each data packet 814. Various techniques may be used to assign packet tags, each of which may include an application identifier 820(*a*) or a customer identifier 820(*b*) as described above. For example, the packet analyzer 818 may assign the packet tags 820 based on source and/or destination IP addresses associated with each packet. As another example, the packet analyzer 818 may perform deep packet analysis or other types of packet analyses to determine and assign the packet tags 820.

The base station 804 has a radio protocol stack 822 that includes a PDCP layer 824, an RLC layer 826, a MAC layer 828, and a PHY layer 830. The PDCP layer 824 has a non-preferred transmission queue 832 and a preferred transmission queue 834. Packets in these queues are taken on a first-in, first-out basis and passed through successively lower layers of the protocol stack 822, until they are transmitted wirelessly by the PHY layer 830.

In the configuration of FIG. 8, IP packets are passed through various system network components from the gateway 816 to the base station 804, and to the PDCP layer 824 of the base station 804.

The system 802 may be configured to perform the method 300 of FIG. 3. More specifically, the TCP/IP layer 812 may perform the actions of receiving and packetizing application data. In the embodiment of FIG. 8, the gateway 816 may perform the subsequent actions of determining packet tags and of forwarding the packets and tags, in this case to the base station 804.

The system 802 may also be configured to perform the method 500 of FIG. 5. Specifically, the actions of FIG. 5 may be performed by the radio protocol stack 822 of the base station 804 to assign data packets to either the non-preferred queue 832 or the preferred queue 834 and to transmit the data packets. For each received data packet 814, the PDCP layer 824 or some other component of the base station 804 or radio protocol stack 822 analyzes the associated packet tags 820 to determine whether to assign the data packet 814 to the non-preferred transmission queue 832 or to the preferred transmission queue 834. In some implementations, data packets may be stored in a common queue 836 before being moved to either the non-preferred queue 832 or the preferred queue 834.

The system 802 may also be configured to perform the method 600 of FIG. 6. Specifically, the actions of FIG. 6 may be performed by the radio protocol stack 822 of the base station 804 to manage queue overflows. As described with reference to FIG. 6, a timeout scheme may be applied to data packets of the non-preferred transmission queue 832, so that packets in the queue for longer than a predetermined period are discarded. Packets of the preferred queue 834, on the other hand, are retained in the preferred queue 834 regardless of the length of time they have been in the preferred queue 834.

Figure 9:
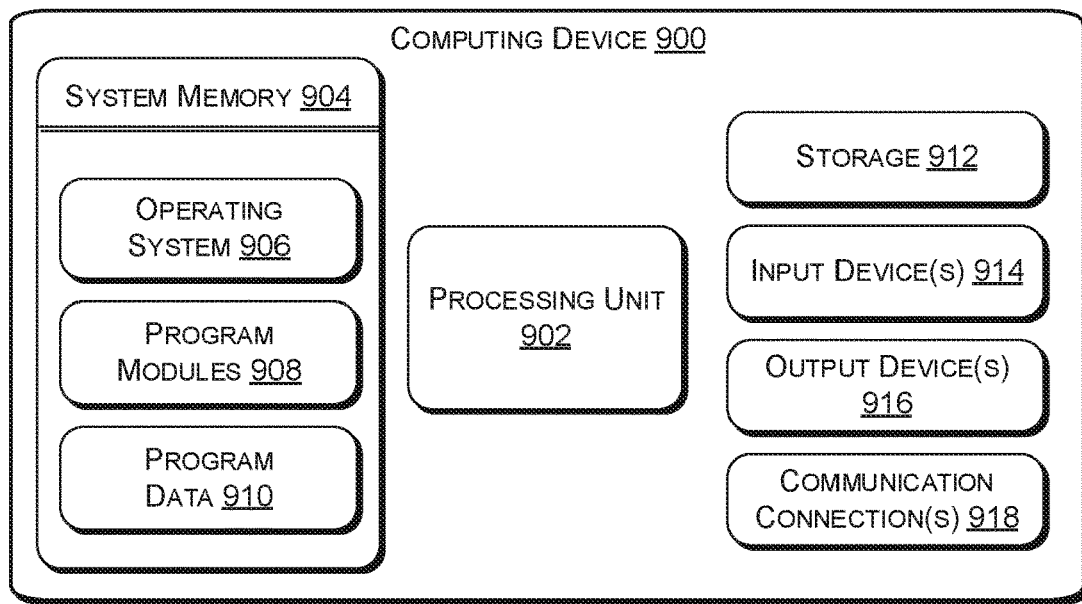
FIG. 9 is a block diagram of an example computing device that may be used to implement various functionality described herein.

FIG. 9 is a block diagram of an illustrative computing device 900 such as may be used to implement various components of a core network, a base station, and/or any servers, routers, gateways, administrative components, functions, or nodes that may be used within a cellular communication system such as described above.

In various embodiments, the computing device 900 may include at least one processing unit 902 and system memory 904. Depending on the exact configuration and type of computing device, the system memory 904 may be volatile (such as RAM), non-volatile (such as ROM, flash memory, etc.) or some combination of the two. The system memory 904 may include an operating system 906, one or more program modules 908, and may include program data 910.

The computing device 900 may also include additional data storage devices (removable and/or non-removable) such as, for example, magnetic disks, optical disks, or tape. Such additional storage devices are illustrated in FIG. 9 as storage 912.

Non-transitory computer storage media of the computing device 900 may include volatile and nonvolatile, removable and non-removable media, implemented in any method or technology for storage of information, such as computer readable instructions, data structures, program modules, or other data. The system memory 904 and storage 912 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 900. Any such non-transitory computer-readable storage media may be part of the computing device 900.

In various embodiment, any or all of the system memory 904 and storage 912 may store programming instructions which, when executed, implement some or all of the function functionality described herein.

The computing device 900 may also have input device(s) 914 such as a keyboard, a mouse, a touch-sensitive display, voice input device, etc. Output device(s) 916 such as a display, speakers, a printer, etc. may also be included. The computing device 900 may also contain communication connections 918 that allow the device to communicate with other computing devices.

Figure 10:
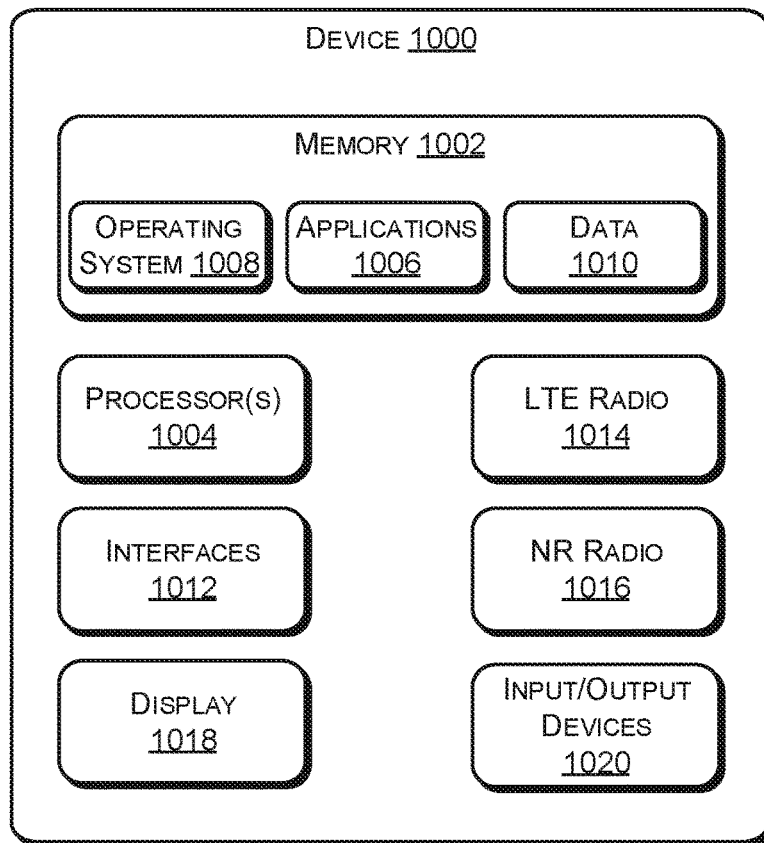
FIG. 10 is a block diagram of an example wireless, mobile communication device that may be to implement various functionality described herein.

FIG. 10 illustrates an example wireless communication device 1000 that may be used in conjunction with the techniques described herein. The device 1000 is an example of the mobile communication devices 102 and 202, illustrating high-level components that may not be shown in FIGS. 1 and 2.

The device 1000 may include memory 1002 and a processor 1004. The memory 1002 may include both volatile memory and non-volatile memory. The memory 1002 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 1002 may include a SIM (subscriber identity module), which is a removable smart card used to identify a user of the device 1000 to a service provider network.

The memory 1002 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 1002 may in some cases include storage media used to transfer or distribute instructions, applications, and/or data. In some cases, the memory 1002 may include data storage that is accessed remotely, such as network-attached storage that the device 1000 accesses over some type of data communication network.

The memory 1002 stores one or more sets of computer-executable instructions (e.g., software) such as programs that embody operating logic for implementing and/or performing desired functionality of the device 1000. The instructions may also reside at least partially within the processor 1004 during execution thereof by the device 1000. Generally, the instructions stored in the computer-readable storage media may include various applications 1006 that are executed by the processor 1004, an operating system (OS) 1008 that is also executed by the processor 1004, and data 1010.

In some embodiments, the processor(s) 1004 is a central processing unit (CPU), a graphics processing unit (GPU), both CPU and GPU, or other processing unit or component known in the art. Furthermore, the processor(s) 1004 may include any number of processors and/or processing cores. The processor(s) 1004 is configured to retrieve and execute instructions from the memory 1002.

The device 1000 may have interfaces 1012, which may comprise any sort of interfaces known in the art. The interfaces 1012 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 1000 may also have an LTE radio 1014 and/or an NR radio 1016, which may be used as described above for implementing communications between networks and mobile devices. The radios 1014 and 1016 transmit and receive radio frequency communications via an antenna (not shown).

The device 1000 may have a display 1018, which may comprise a liquid crystal display (LCD) or any other type of display commonly used in telemobile devices or other portable devices. For example, the display 1018 may be a touch-sensitive display screen, which may also act as an input device or keypad, such as for providing a soft-key keyboard, navigation buttons, or the like.

The device 1000 may have input and output devices 1020. These devices may include any sort of output devices known in the art, such as speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method performed by one or more components of a cellular communication system that uses non-standalone (NSA) mode dual connectivity in conjunction with a Long-Term Evolution (LTE) radio access network and a New Radio (NR) radio access network, the method comprising:
   receiving application data from one or more applications;
   packetizing the application data to create data packets;
   associating one or more packet tags with a data packet of the data packets, the one or more packet tags including at least one of an application identifier or a customer identifier;
   by a Packet Data Convergence Protocol (PDCP) layer of the one or more components, receiving a first data packet and a first packet tag associated with the first data packet;
   by the PDCP layer based at least in part on the first packet tag, determining to transmit the first data packet using the LTE radio access network and storing the first data packet in a first transmission queue that is associated with the LTE radio access network;

by the PDCP layer, receiving a second data packet and a second packet tag associated with the second data packet;

by the PDCP layer based at least in part on the second packet tag, determining to transmit the second data packet using the NR radio access network and storing the second data packet in a second transmission queue that is associated with the NR radio access network;

obtaining the first data packet from the first transmission queue and transmitting the first data packet using the LTE radio access network; and obtaining the second data packet from the second transmission queue and transmitting the second data packet using the NR radio access network.

2. The method of claim 1, wherein the one or more components are of a mobile communication device.

3. The method of claim 1, wherein the PDCP layer is of a cellular base station of the cellular communication system.

4. The method of claim 1, further comprising, by the PDCP layer:
storing the first data packet in a common packet queue prior to determining to transmit the first data packet using the LTE radio access network; and
storing the second data packet in the common packet queue prior to determining to transmit the second data packet using the NR radio access network.

5. The method of claim 1, further comprising determining relative transmission priorities of the first and second data packets based at least in part on the at least one of the application identifier and the customer identifier.

6. The method of claim 1, wherein determining to transmit the first data packet using the LTE radio access network and determining to transmit the second data packet using the NR radio access network are based at least in part on a prioritization of radio access network performance characteristics that have been associated with at the least one of the application identifier or the customer identifier, wherein the radio access network performance characteristics include one or more of latency, reliability, or throughput.

7. The method of claim 1, further comprising, by the PDCP layer;
observing performance characteristics of the LTE radio access network and performance characteristics of the NR radio access network at multiple times and/or locations;
based at least on the observing, determining predicted performance characteristics of the LTE radio access network and predicted performance characteristics of the NR radio access network at a current time and/or location; and
wherein determining to transmit the first data packet using the LTE radio access network and determining to transmit the second data packet using the NR radio access network are based at least in part on the predicted performance characteristics of the LTE radio access network and the predicted performance characteristics of the NR radio access network.

8. A method performed by one or more components of a cellular communication system that uses dual connectivity in conjunction with a first radio access network and a second radio access network, the method comprising:
receiving a first data packet and an associated first packet tag;
based at least in part on the first packet tag, determining to transmit the first data packet using the first radio access network and storing the first data packet in a first transmission queue corresponding to the first radio access network;
receiving a second data packet and an associated second packet tag;
based at least in part on the second packet tag, determining to transmit the second data packet using the second radio access network and storing the second data packet in a second transmission queue corresponding to the second radio access network;
obtaining data packets from the first transmission queue and transmitting the data packets from the first transmission queue using the first radio access network; and
obtaining the data packets from the second transmission queue and transmitting the data packets from the second transmission queue using the second radio access network.

9. The method of claim 8, wherein the method is performed by one or more base stations of the cellular communication system.

10. The method of claim 8, wherein the method is performed a mobile communication device of the cellular communication system.

11. The method of claim 8, wherein:
the first radio access network comprises a Long-Term Evolution (LTE) radio access network; and
the second radio access network comprises a New Radio (NR) radio access network.

12. The method of claim 8, wherein the first packet tag comprises at least one of a customer identifier and an application identifier.

13. The method of claim 8, further comprising, by a gateway of the cellular communication system, associating the first and second packet tags with the first and second data packets, respectively.

14. The method of claim 8, wherein the method is performed by a Packet Data Convergence Protocol (PDCP) layer of a radio protocol stack.

15. The method of claim 8, wherein determining to transmit the first data packet using the first radio access network and determining to transmit the second data packet using the second radio access network are based at least in part on packet inspection of received data packets.

16. The method of claim 8, further comprising:
observing performance characteristics of the first radio access network and the second radio access network at multiple times and/or locations;
based at least on the observing, determining predicted performance characteristics of the first radio access network and the predicted performance characteristics of the second radio access network at a current time and/or location; and
wherein determining to transmit the first data packet using the first radio access network and determining to transmit the second data packet using the second radio access network are based at least in part on the predicted performance characteristics of the first radio access network and the predicted performance characteristics of the second radio access network.

17. One or more cellular communication components, comprising:
one or more processors; and
one or more non-transitory computer-readable media storing computer-executable instructions that, when executed by the one or more processors, cause the one or more cellular communication components to perform actions comprising:

receiving data packets from applications;

operating in a Non-Standalone (NSA) mode to wirelessly transmit the data packets using a Long-Term Evolution (LTE) communication channel and a New Radio (NR) communication channel;

determining that a first data packet is associated with at least one of a first application and a first customer;

in response to determining that the first data packet is associated with the at least one of the first application and the first customer, wirelessly transmitting the first data packet using the LTE communication channel;

receiving a second data packet;

determining that the second data packet is associated with at least one of a second application and a second customer; and in response to determining that the second data packet is associated with the at least one of the second application and the second customer, wirelessly transmitting the second data packet using the NR communication channel.

18. The one or more cellular communication components of claim 17, wherein determining that the first data packet is associated with at least one of the first application and the first customer comprises receiving at least one of an application identifier or a customer identifier that has been associated with the first data packet.

19. The one or more cellular communication components of claim 17, wherein the one or more cellular communication components comprise a mobile communication device.

20. The one or more cellular communication components of claim 17, wherein the one or more cellular communication components comprise a base station of a cellular communication network.

* * * * *